(12) United States Patent
Takeuchi et al.

(10) Patent No.: US 9,878,580 B2
(45) Date of Patent: Jan. 30, 2018

(54) RUBBER COMPOSITION FOR PNEUMATIC TIRES FOR CONSTRUCTION VEHICLES

(71) Applicant: The Yokohama Rubber Co., LTD., Minato-ku, Tokyo (JP)

(72) Inventors: Mizuki Takeuchi, Hiratsuka (JP); Yuki Shimizu, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/655,887

(22) PCT Filed: Dec. 19, 2013

(86) PCT No.: PCT/JP2013/084096
§ 371 (c)(1),
(2) Date: Jun. 26, 2015

(87) PCT Pub. No.: WO2014/103876
PCT Pub. Date: Jul. 3, 2014

(65) Prior Publication Data
US 2015/0336423 A1    Nov. 26, 2015

(30) Foreign Application Priority Data

Dec. 28, 2012    (JP) ................................ 2012-286852

(51) Int. Cl.
| | | |
|---|---|---|
| *C08K 3/04* | (2006.01) | |
| *C08K 9/04* | (2006.01) | |
| *C08K 3/06* | (2006.01) | |
| *C08K 3/36* | (2006.01) | |
| *C08K 5/548* | (2006.01) | |
| *B29D 30/60* | (2006.01) | |
| *B60C 1/00* | (2006.01) | |
| *C08L 9/00* | (2006.01) | |
| *C08L 7/00* | (2006.01) | |

(52) U.S. Cl.
CPC .............. *B60C 1/00* (2013.01); *B60C 1/0016* (2013.01); *C08K 3/04* (2013.01); *C08K 3/06* (2013.01); *C08K 3/36* (2013.01); *C08K 5/548* (2013.01); *C08K 9/04* (2013.01); *C08L 7/00* (2013.01); *C08L 9/00* (2013.01); *B29D 30/60* (2013.01)

(58) Field of Classification Search
CPC ... C08K 3/04; C08K 9/04; C08K 3/06; C08K 3/36; C08K 5/548; C08K 2003/045; B60C 1/0016; B60C 1/00; B29D 30/60; C08L 9/00; C08L 7/00
USPC ...................................................... 152/209.1
See application file for complete search history.

(56) References Cited

U.S. PATENT DOCUMENTS

| | | | |
|---|---|---|---|
| 5,856,393 A | 1/1999 | Matsue et al. | |
| 2008/0009570 A1* | 1/2008 | Miyazaki ................. | B60C 1/00 524/89 |
| 2010/0224301 A1* | 9/2010 | Sakamoto ............ | B60C 1/0041 152/547 |
| 2011/0265923 A1 | 11/2011 | Arnold et al. | |

FOREIGN PATENT DOCUMENTS

| | | |
|---|---|---|
| JP | S64-051448 | 2/1989 |
| JP | H01-092247 | 4/1989 |
| JP | H09-150606 | 6/1997 |
| JP | H09-268237 | 10/1997 |
| JP | H10-087881 | 4/1998 |
| JP | H10-219034 | 8/1998 |
| JP | 2007-216829 | 8/2007 |
| JP | 2012-177085 | 9/2012 |
| WO | WO 2010/077232 | 7/2010 |

OTHER PUBLICATIONS

English Language Machine Translation of JP 09-150606, Jun. 10, 1997.*
Encyclopedia of Polymer Science and Technology, Carbon Black, Oct. 10, 2003, p. 67.*
International Search Report for International Application No. PCT/2013/084096 dated Feb. 4, 2014, 4 pages, Japan.

* cited by examiner

*Primary Examiner* — Angela C Scott
(74) *Attorney, Agent, or Firm* — Thorpe North & Western

(57) ABSTRACT

The present technology provides a rubber composition containing: from 20 to 40 parts by weight of carbon black, from 15 to 30 parts by weight of silica, from 2.0 to 3.5 parts by weight of sulfur, and a sulfur-containing silane coupling agent, per 100 parts by weight of diene rubber that contains from 80 to 100 wt. % of natural rubber, and from 20 to 0 wt. % of isoprene rubber; the total amount of sulfur in the sulfur and the sulfur-containing silane coupling agent being from 2.3 to 4.0 parts by weight.

15 Claims, 1 Drawing Sheet

RUBBER COMPOSITION FOR PNEUMATIC TIRES FOR CONSTRUCTION VEHICLES

TECHNICAL FIELD

The present technology relates to a rubber composition for pneumatic tires for construction vehicles, which has enhanced low heat build-up, cut resistance, and moldability.

BACKGROUND

Construction vehicles, such as large dump trucks that operate at quarries and/or large-scale construction sites, operate for a long time while carrying a heavy load. Large heavy duty tires mounted on such a construction vehicle are required not only to have excellent cut resistance but also to prevent tire failure by suppressing heat build-up which is achieved by suppressing overheating of the tire. Cut resistance is a property that makes it difficult to damage a tire when the tire is brought into contact or collision with a barrier or external object. Heat build-up is a property that mitigates the impact by heating up the rubber by converting the energy applied to the tire via such a physical impact into heat. Because of this, in order to make the cut resistance of the tire to be excellent, large heat build-up of the rubber is required. On the other hand, in order to avoid overheating of the tire and failure due to the overheating, heat build-up of the rubber is required to be low. Thus, the cut resistance and low heat build-up are in a trade-off relationship.

Since the pneumatic tire for construction vehicles described above has a significantly large tire size, molding of the tire is very difficult. For example, when a tire tread portion of such a large tire is molded, it is not possible to mold a green tire by integrally extrusion-molding the rubber portion which forms the tread portion and winding the extruded rubber portion in the same manner as for small tires. Because of this, typically, a tread portion of a large tire is formed by laminating a plurality of rubber sheets having a smaller thickness than the thickness of the designed tread portion, or by spirally winding a rubber strip in a manner that the wound rubber strip overlaps itself. In forming methods that laminate rubber sheets or that wind a rubber strip around in a manner that the wound rubber strip overlaps itself, it is necessary to compound a softening agent or the like in the rubber composition that constitutes the rubber sheet or rubber strip, in order to ensure suitable moldability. However, since compounding agents such as softening agents make heat build-up of rubber compositions greater, it has been difficult to achieve both moldability and low heat build-up in large tires.

International Patent Publication No. WO/2010/077232 proposes to compound silica, carbon black, a silane coupling agent, sulfur, and a sulfenamide accelerator at specific proportions into natural rubber in order to reduce the rolling resistance of tires for large vehicles. However, with this rubber composition, effects of enhancing cut resistance and moldability are not always sufficient. Because of this, further enhancement that can achieve both low heat build-up, and cut resistance and moldability has been demanded.

SUMMARY

The present technology provides a rubber composition for pneumatic tires for construction vehicles, which has low heat build-up, cut resistance, and moldability enhanced to or beyond conventional levels.

The rubber composition for pneumatic tires for construction vehicles of the present technology which achieves the above objective is a rubber composition containing: from 20 to 40 parts by weight of carbon black, from 15 to 30 parts by weight of silica, from 2.0 to 3.5 parts by weight of sulfur, and a sulfur-containing silane coupling agent, per 100 parts by weight of diene rubber that contains from 80 to 100 wt. % of natural rubber, and from 20 to 0 wt. % of isoprene rubber; the total amount of sulfur in the sulfur and the sulfur-containing silane coupling agent being from 2.3 to 4.0 parts by weight.

Since the rubber composition for pneumatic tires for construction vehicles of the present technology contains predetermined amounts of carbon black, silica, sulfur, and a sulfur-containing silane coupling agent in diene rubber containing natural rubber as a main component, and limits the total amount of sulfur in the sulfur and the sulfur-containing silane coupling agent, it is possible to enhance the cut resistance to or beyond conventional levels while reducing heat build-up of the rubber composition. Furthermore, moldability can be maintained/enhanced while the compounding ratio of oils, softening agents, and the like is reduced.

The pneumatic tire for construction vehicles of the present technology comprises a tread portion formed by laminating rubber sheets having any width formed from the rubber composition described above. This pneumatic tire for construction vehicles can suppress heat build-up and prevent failure due to overheating of the tire. Since the cut resistance is also enhanced to or beyond conventional levels at the same time, tire durability can be also enhanced. Furthermore, since this pneumatic tire for construction vehicles uses the rubber composition having excellent moldability such as a sheet laminating property, tires with excellent quality, as described above, can be efficiently produced while ensuring the quality of the tire.

DETAILED DESCRIPTION

Figure 1:
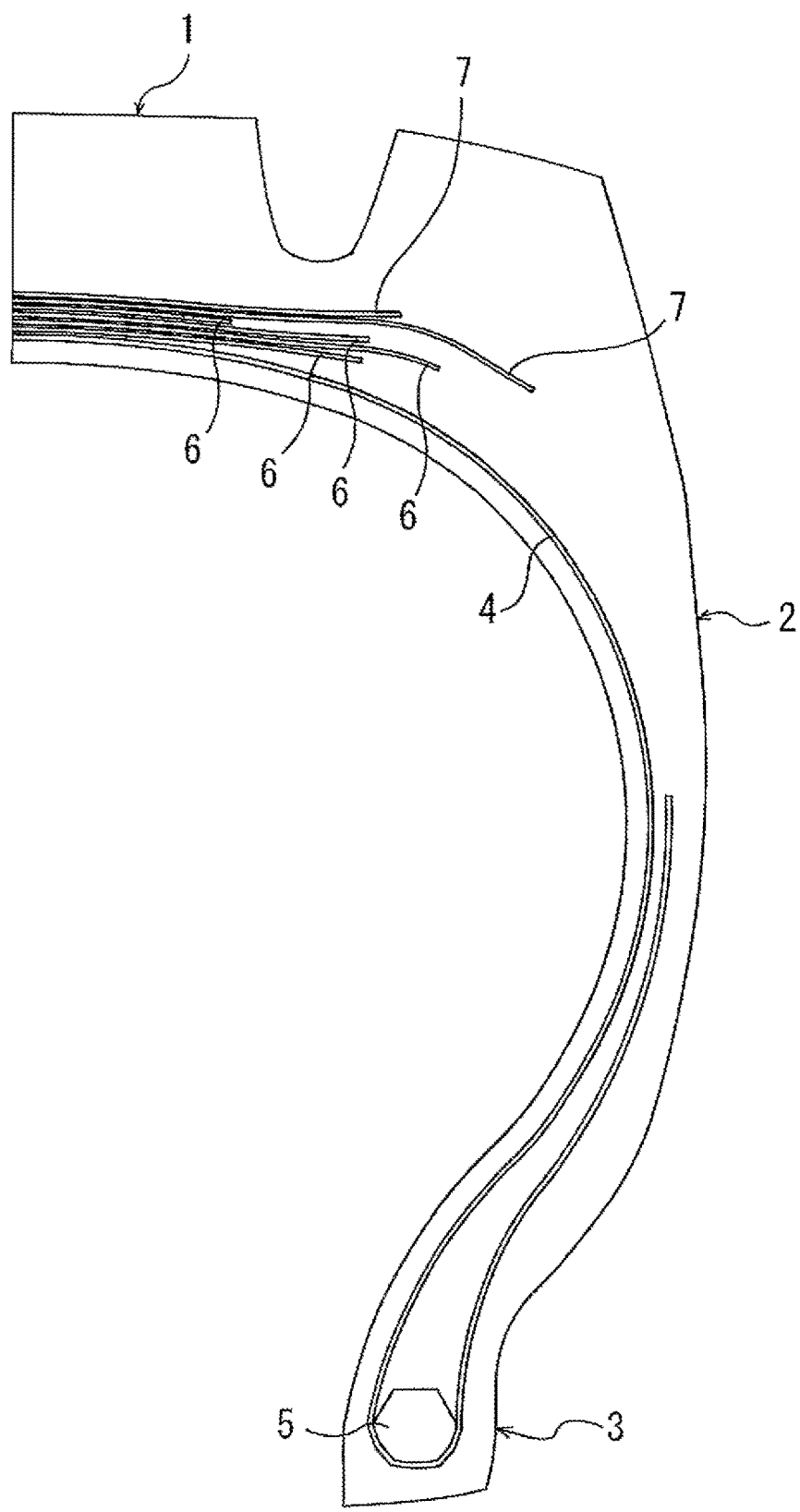
FIG. 1 is a half cross-sectional view taken along a meridian illustrating an example of an embodiment of a pneumatic tire for construction vehicles.

FIG. 1 is an explanatory view illustrating an embodiment of the pneumatic tire for construction vehicles that uses the rubber composition of the present technology.

In FIG. 1, the pneumatic tire for construction vehicles comprises a tread portion 1, side wall portion 2, and bead portion 3. A carcass layer 4 including a plurality of reinforcing cords extending in a tire radial direction is mounted between a pair of left and right bead portions 3,3. Ends of the carcass layer 4 are folded around the bead cores 5 from a tire inner side to a tire outer side.

A plurality of layers of belt layers 6 is embedded on an outer circumferential side of the carcass layer 4 in the tread portion 1. These belt layers 6 include a plurality of reinforcing cords that incline with respect to the tire circumferential direction and the reinforcing cords are disposed between the layers so as to intersect each other. Furthermore, on the outer circumferential side of the belt layers 6, a plurality of layers of belt protecting layers 7 is embedded. While the belt layers 6 reinforce the tread portion 1, the belt protecting layers 7 are disposed to protect the belt layers 6. These belt protecting layers 7 include a plurality of reinforcing cords that incline with respect to the tire circumferential direction and the reinforcing cords are disposed so the reinforcing cords of each layer intersect each other.

The rubber composition for pneumatic tires for construction vehicles of the present technology is used for a pneumatic tire for construction vehicles. In particular, the rubber composition is suitable as a material for forming the tread portion 1 of the pneumatic tire for construction vehicles. The tread portion of the pneumatic tire for construction vehicles is, especially, preferably formed by laminating rubber sheets having any width formed from the rubber composition for pneumatic tires for construction vehicles.

In the rubber composition for pneumatic tires for construction vehicles of the present technology, the rubber component is diene rubber and contains natural rubber, or natural rubber and isoprene rubber. Since the diene rubber is composed of natural rubber and isoprene rubber, rubber strength of the rubber composition, cracking resistance, and setting resistance can be ensured at high levels.

The content of natural rubber in 100 wt. % of the diene rubber is from 80 to 100 wt. %, and preferably from 90 to 100 wt. %. When the content of the natural rubber is less than 80 wt. %, cut resistance may not be sufficiently enhanced. The content of isoprene rubber in 100 wt. % of the diene rubber is from 20 to 0 wt. %, and preferably from 10 to 0 wt. %. When the content of the isoprene rubber is greater than 20 wt. %, cut resistance may not be sufficiently enhanced.

In the present technology, the diene rubber contains 100 wt. % of natural rubber or a total of 100 wt. % of natural rubber and isoprene rubber. Note that, when various compounding agents are added to the rubber composition, another diene rubber other than natural rubber and isoprene rubber may be used as a diluting material or a base rubber of a master batch. The present technology does not exclude use of such a compounding agent, and such a compounding agent may be contained in the range that does not impair the object of the present technology. Examples of other diene rubbers include butadiene rubber, styrene-butadiene rubber, acrylonitrile-butadiene rubber, butyl rubber, and the like.

The rubber composition for pneumatic tires for construction vehicles of the present technology contains from 20 to 40 parts by weight, and preferably from 25 to 35 parts by weight, of carbon black per 100 parts by weight of the diene rubber. By compounding the carbon black, the strength of the rubber composition can be increased, thereby increasing cut resistance. When the compounding ratio of the carbon black is less than 20 parts by weight, the rubber strength and cut resistance of the rubber composition will deteriorate. When the compounding ratio of the carbon black is greater than 40 parts by weight, heat build-up of the rubber composition will be large, thereby also deteriorating cut resistance.

The carbon black used in the present technology preferably has a nitrogen adsorption specific surface area of 70 to 145 $m^2/g$, and more preferably 85 to 125 $m^2/g$. When the nitrogen adsorption specific surface area is less than 70 $m^2/g$, mechanical properties such as rubber strength of the rubber composition may be lowered and cut resistance may deteriorate. When the nitrogen adsorption specific surface area is greater than 145 $m^2/g$, heat build-up may be increased. The nitrogen adsorption specific surface area of the carbon black is measured in accordance with JIS (Japanese Industrial Standard) K6217-2.

In the present technology, silica is compounded at 15 to 30 parts by weight, preferably 15 parts by weight or greater but less than 30 parts by weight, and more preferably from 20 to 28 parts by weight, per 100 parts by weight of diene rubber. By compounding silica, heat build-up of the rubber composition can be made small. When the compounding ratio of silica is less than 15 parts by weight, heat build-up of the rubber composition will be increased. When the compounding ratio of silica is greater than 30 parts by weight, moldability such as a sheet laminating property of the rubber composition will deteriorate.

In the present technology, the total amount of carbon black and silica is preferably from 45 to 70 parts by weight, and more preferably from 50 to 65 parts by weight, per 100 parts by weight of diene rubber. When the total amount of carbon black and silica is less than 45 parts by weight, mechanical strength of the rubber may be lowered and cut resistance may deteriorate. When the total amount of carbon black and silica is greater than 70 parts by weight, heat build-up may deteriorate.

The silica that is used may be a silica that is ordinarily used in rubber compositions for tires such as, for example, wet silica, dry silica, surface-treated silica, or the like. The silica to be used may be appropriately selected from commercially available products. Additionally, a silica obtained through a regular manufacturing method may be used.

The nitrogen adsorption specific surface area of silica is not particularly limited; however, the nitrogen adsorption specific surface area is preferably from 110 to 200 $m^2/g$, and more preferably from 150 to 180 $m^2/g$. The nitrogen adsorption specific surface area of silica of less than 110 $m^2/g$ is not preferable because mechanical strength of the rubber may be lowered and cut resistance may deteriorate. Furthermore, the nitrogen adsorption specific surface area of silica of greater than 200 $m^2/g$ is not preferable because heat build-up will be increased. Note that the nitrogen adsorption specific surface area of the silica is determined in accordance with JIS K6217-2.

The rubber composition for pneumatic tires for construction vehicles of the present technology contains a sulfur-containing silane coupling agent as well as silica. By compounding the sulfur-containing silane coupling agent, dispersibility of the silica can be enhanced, low heat build-up of the rubber composition can be made even lower, and moldability such as a sheet laminating property can be enhanced.

The sulfur-containing silane coupling agent is not particularly limited; however, examples thereof include bis-(3-triethoxysilylpropyl)tetrasulfide, bis(3-triethoxysilylpropyl) disulfide, 3-trimethoxysilylpropylbenzothiazol tetrasulfide, γ-mercaptopropyltriethoxysilane, 3-octanoylthiopropyltriethoxysilane, and the like. Of these, bis-(3-triethoxysilylpropyl)tetrasulfide and bis(3-triethoxysilylpropyl)disulfide are preferable.

In the present technology, the total amount of sulfur contained in the sulfur-containing silane coupling agent and sulfur that is compounded for vulcanization needs to be in a range of 2.3 to 4.0 parts by weight per 100 parts by weight of diene rubber. The compounding ratio of the sulfur-containing silane coupling agent is not particularly limited as long as the total amount of sulfur of the sulfur-containing silane coupling agent and the sulfur for vulcanization is within the range described above; however, the compounding ratio is preferably from 5 to 20 wt. %, and more preferably from 8 to 12 wt. %, relative to the compounded amount of silica. When the compounding ratio of the sulfur-containing silane coupling agent is less than 5 wt. % of the amount of silica, the effect of enhancing the dispersibility of the silica cannot be sufficiently obtained. If the compounding ratio of the sulfur-containing silane coupling agent is greater than 20 wt. % of the amount of silica, the silane coupling agent will condense with itself, and the desired effects cannot be obtained.

In the present technology, other fillers aside from carbon black and silica may be compounded. Examples of other fillers include clay, mica, talc, calcium carbonate, aluminum hydroxide, aluminum oxide, titanium oxide, and the like. Of these, aluminum hydroxide, aluminum oxide, and titanium oxide are preferable. By compounding other fillers, mechanical properties of the rubber composition can be further enhanced, a balance between low heat build-up, and cut resistance and processability when the rubber composition is formed into a tire can be enhanced.

The rubber composition for pneumatic tires for construction vehicles of the present technology contains from 2.0 to 3.5 parts by weight, and preferably from 2.5 to 3.0 parts by weight of sulfur as a vulcanization agent, per 100 parts by weight of the diene rubber. When the compounding ratio of sulfur is less than 2.0 parts by weight, cut resistance will deteriorate. Furthermore, when the compounding ratio of sulfur is greater than 3.5 parts by weight, heat aging resistance will deteriorate.

In the present technology, the total amount of sulfur in the sulfur and the sulfur-containing silane coupling agent is from 2.3 to 4.0 parts by weight, and preferably from 2.4 to 3.4 parts by weight, per 100 parts by weight of diene rubber. Here, "total amount of sulfur" is a total of the net amount of sulfur contained in the vulcanizing agent and the net amount of sulfur contained in the sulfur-containing silane coupling agent; and the "total amount of sulfur" is the amount of sulfur used in chemical bonding involved in vulcanization. For example, when the vulcanizing agent contains sulfur and oil, the "total amount of sulfur" refers to the net amount of sulfur excluding the amount of oil.

When the total amount of sulfur in the sulfur and the sulfur-containing silane coupling agent is less than 2.3 parts by weight, heat build-up and cut resistance will deteriorate. Furthermore, when the total amount of sulfur in the sulfur and the sulfur-containing silane coupling agent is greater than 4.0 parts by weight, heat aging resistance will deteriorate.

Since the rubber composition for pneumatic tires for construction vehicles of the present technology has excellent moldability such as a sheet laminating property, it is possible to reduce or avoid blending of components that increase heat build-up such as various oils and plasticizers. The rubber composition for pneumatic tires for construction vehicles preferably contains no oils or plasticizers.

The rubber composition for pneumatic tires for construction vehicles may also contain various types of additives that are commonly used in rubber compositions for tires, such as vulcanization or crosslinking agents, vulcanization accelerators, and antiaging agents, in the range that does not impair the object of the present technology. These additives may be kneaded according to any common method to form the rubber composition and may be used in vulcanization or crosslinking. The compounding ratio of these additives may be any conventional ratio, as long as the object of the present technology is not impaired. The rubber composition for pneumatic tires for construction vehicles of the present technology can be produced by mixing each of the components described above using a commonly used rubber kneading machine, such as a Banbury mixer, a kneader, and a roller.

Pneumatic tires that uses the rubber composition for pneumatic tires for construction vehicles of the present technology can reduce tire failure caused by overheating of the tire since the temperature increase in the tire can be suppressed due to small heat build-up when the tire is running or brought into contact or collision with an external object. Furthermore, the pneumatic tires are excellent in cut resistance and can enhance tire durability at quarries and/or construction sites. Furthermore, since the rubber composition having excellent moldability is used, tires with excellent quality, as described above, can be efficiently produced while the quality of the tire is ensured. Note that "pneumatic tire for construction vehicles" refers to a large tire that is mounted on a large vehicle where a load of 2 to 100 tons is applied to a single tire.

The pneumatic tire for construction vehicles of the present technology comprises a tread portion formed by laminating rubber sheets having an any width formed from the rubber composition for pneumatic tires for construction vehicles described above. That is, the pneumatic tire for construction vehicles is preferably formed by molding a rubber sheet using the rubber composition for pneumatic tires for construction vehicles of the present technology, the rubber sheet having a wall thickness that is thinner than a designed thickness as a rubber layer forming a tread portion, and the rubber sheet having the same width as a width of the tread portion or having a smaller width than the width of the tread portion; and winding the obtained rubber sheet around the tread portion of a green tire for a plurality of times to laminate. Alternatively, the pneumatic tire for construction vehicles is preferably formed by molding a rubber strip using the rubber composition for pneumatic tires for construction vehicles of the present technology, the rubber strip having a smaller width and thinner thickness than the designed values as the rubber layer forming the tread portion; and spirally winding the obtained rubber strip around the tread portion of the green tire to laminate the rubber strip in the radial direction.

Since these rubber sheet and rubber strip are formed by the rubber composition of the present technology and have excellent moldability such as a sheet laminating property, tires with excellent quality can be stably and efficiently produced.

The present technology is further explained below by examples. However, the scope of the present technology is not limited to these examples.

EXAMPLES

Seven types of rubber compositions for pneumatic tires for construction vehicles were prepared according to the formulations shown in Table 1 (Working Examples 1 and 2 and Comparative Examples 1 to 5). The compounding agent as shared formulation shown in Table 2 (with the exception of the sulfur and vulcanization accelerator) were compounded with the rubber compositions, and the mixtures were kneaded in a 1.8 L sealed mixer for 5 minutes at 160° C. The mixtures were then extruded as master batches, to which the sulfur and vulcanization accelerator were added. The master batches were then kneaded with an open roller. The total amount of sulfur in the sulfur and the sulfur-containing silane coupling agent is shown on "total sulfur content" row of Table 1. Note that the amounts of the shared formulation shown in Table 2 are expressed as parts by weight per 100 parts by weight of the diene rubbers (net amount of rubber) shown in Table 1.

Rubber sheets having a width of 30 mm and a thickness of 3 mm were extrusion-molded using the obtained seven types of rubber compositions for pneumatic tires for construction vehicles. Using the obtained rubber sheet, a sheet laminating property, as moldability, was tested by the method described below.

Moldability (Sheet Laminating Property)

Using the obtained rubber sheet, strip winding extrusion was performed using an actual device. Extrusion was performed for 120 seconds and the fluctuation in the ribbon width was recorded using a data logger. Furthermore, texture of the ribbon and unevenness of the edge were determined visually and expressed in index values. The obtained results are shown on the "moldability" row as index values with the value of Comparative Example 1 expressed as an index of 100. Larger index values of moldability mean better sheet laminating property.

Thereafter, pneumatic tires for construction vehicles having a tire size of 2700R49 were molded. Rubber sheets having a width of 30 mm and a thickness of 3 mm were extrusion-molded using the seven types of rubber compositions for pneumatic tires for construction vehicles described above. By winding the obtained rubber sheet around the tread portion for a plurality of times, a green tire was molded, and then the green tire was vulcanized to produce a pneumatic tire for construction vehicles.

Using the produced pneumatic tires for construction vehicles, heat build-up and cut resistance were tested by the method described below.

Heat Build-Up

Using the obtained pneumatic tires for construction vehicles, inner temperature of the tread (5 mm from overhead cover) after traveling for a fixed length of time was measured and expressed in index values. The obtained results are shown on the "heat build-up" row as index values with the value of Comparative Example 1 expressed as an index of 100. Larger index values of heat build-up mean better low heat build-up and better suppression of the temperature increase in tire.

Cut Resistance

The obtained pneumatic tires for construction vehicles were mounted on a large dump truck, and degree and numbers of cuts and scratches were visually determined after traveling off road for 1500 hours. The obtained results are shown on the "cut resistance" row as index values with the value of Comparative Example 1 expressed as an index of 100. Larger index values of cut resistance indicate superior cut resistance and tire durability.

TABLE 1

|  |  | Comparative Example 1 | Comparative Example 2 | Comparative Example 3 | Comparative Example 4 |
|---|---|---|---|---|---|
| NR | pbw | 100 | 100 | 100 | 100 |
| Carbon black | pbw | 55 | 55 | 45 | 45 |
| Silica | pbw |  |  | 10 | 10 |
| Coupling agent | pbw |  |  |  | 0.8 |
| Oil | pbw |  | 5 |  |  |
| Sulfur | pbw | 2.70 | 2.70 | 2.70 | 2.52 |
| Total sulfur content | pbw | 2.57 | 2.57 | 2.57 | 2.58 |

TABLE 1-continued

| Moldability | Index value | 100 | 106 | 95 | 100 |
|---|---|---|---|---|---|
| Heat build-up | Index value | 100 | 95 | 110 | 116 |
| Cut resistance | Index value | 100 | 97 | 97 | 98 |

|  |  | Working Example 1 | Working Example 2 | Comparative Example 5 |
|---|---|---|---|---|
| NR | pbw | 100 | 100 | 100 |
| Carbon black | pbw | 40 | 30 | 20 |
| Silica | pbw | 15 | 25 | 35 |
| Coupling agent | pbw | 1.2 | 2.0 | 2.8 |
| Oil | pbw |  |  |  |
| Sulfur | pbw | 2.43 | 2.25 | 2.07 |
| Total sulfur content | pbw | 2.58 | 2.59 | 2.60 |
| Moldability | Index value | 102 | 106 | 92 |
| Heat build-up | Index value | 116 | 129 | 146 |
| Cut resistance | Index value | 104 | 115 | 111 |

The types of raw materials used shown in Table 1 are described below.

NR: natural rubber, STR 20
Carbon black: Sho Black N234, manufactured by Cabot Japan K.K.
Silica: 1165MP, manufactured by Degussa
Coupling agent: sulfur-containing silane coupling agent (sulfur content: 22.5 wt. %), Si69, manufactured by Degussa
Oil: Extract No. 4S, manufactured by Showa Shell Sekiyu K.K.
Sulfur: Golden Flower oil treated sulfur powder (sulfur content: 95.24 wt. %), manufactured by Tsurumi Chemical Industry Co., Ltd.

TABLE 2

| Composition of shared formulation | | |
|---|---|---|
| Zinc oxide | pbw | 3.0 |
| Stearic acid | pbw | 1.5 |
| Antiaging agent | pbw | 1.5 |
| Vulcanization accelerator | pbw | 1.5 |

The types of raw materials used shown in Table 2 are described below.

Zinc oxide: Zinc Oxide III, manufactured by Seido Chemical Industry Co., Ltd.
Stearic acid: beads stearic acid, manufactured by NOF Corporation
Antiaging agent: Antigen 6C, manufactured by Sumitomo Chemical Co., Ltd.
Vulcanization accelerator: Santocure CBS, manufactured by FLEXSYS As is clear from Table 1, in the rubber compositions for pneumatic tires for construction vehicles of Working Examples 1 and 2 and pneumatic tires for construction vehicles formed by using these rubber compositions, it was confirmed that a balance between moldability, and low heat build-up and cut resistance were enhanced to or beyond conventional levels.

Furthermore, as is clear from Table 1, although the rubber composition of Comparative Example 2 exhibited enhanced moldability since an oil was added to the rubber composition of Comparative Example 1, heat build-up was increased and cut resistance was lowered.

Since the rubber composition of Comparative Example 3 had the compounding ratio of carbon black of greater than 40 parts by weight and the compounding ratio of silica of less than 15 parts by weight, and contained no sulfur-containing silane coupling agent, moldability and cut resistance were deteriorated.

Since the rubber composition of Comparative Example 4 had the compounding ratio of carbon black of greater than 40 parts by weight and the compounding ratio of silica of less than 15 parts by weight, cut resistance was deteriorated.

Since the rubber composition of Comparative Example 5 had the compounding ratio of silica of greater than 30 parts by weight, moldability was deteriorated.

What is claimed is:

1. A rubber composition for pneumatic tires for construction vehicles, the rubber composition comprising: from 20 to 40 parts by weight of carbon black, from 15 to 30 parts by weight of silica, from 2.0 to 3.5 parts by weight of sulfur, and a sulfur-containing silane coupling agent, per 100 parts by weight of diene rubber that contains natural rubber in an amount of from 80 wt. % to 95 wt. % and isoprene rubber in an amount of from 5 wt. % to 20 wt. %; a total amount of the sulfur in the sulfur and the sulfur-containing silane coupling agent being from 2.4 to 4.0 parts by weight.

2. The rubber composition for pneumatic tires for construction vehicles according to claim 1, comprising from 90 wt. % to 95 wt. % of the natural rubber per 100 parts by weight of the diene rubber.

3. The rubber composition for pneumatic tires for construction vehicles according to claim 1, comprising from 10 wt. % to 5 wt. % of isoprene rubber per 100 parts by weight of the diene rubber.

4. The rubber composition for pneumatic tires for construction vehicles according to claim 1, comprising from 20 to 35 parts by weight of the carbon black.

5. The rubber composition for pneumatic tires for construction vehicles according to claim 1, wherein the carbon black has a nitrogen adsorption specific surface area of from 70 to 145 $m^2/g$.

6. The rubber composition for pneumatic tires for construction vehicles according to claim 1, wherein the carbon black has a nitrogen adsorption specific surface area of from 85 to 125 $m^2/g$.

7. The rubber composition for pneumatic tires for construction vehicles according to claim 1, comprising from 20 to 28 parts by weight of the silica.

8. The rubber composition for pneumatic tires for construction vehicles according to claim 1, wherein a total amount of the carbon black and the silica is from 45 to 70 parts by weight per 100 parts by weight of diene rubber.

9. The rubber composition for pneumatic tires for construction vehicles according to claim 1, wherein a total amount of the carbon black and the silica is from 50 to 65 parts by weight per 100 parts by weight of diene rubber.

10. The rubber composition for pneumatic tires for construction vehicles according to claim 1, wherein a nitrogen adsorption specific surface area of the silica is from 110 to 200 $m^2/g$.

11. The rubber composition for pneumatic tires for construction vehicles according to claim 1, wherein a nitrogen adsorption specific surface area of the silica is from 150 to 180 $m^2/g$.

12. The rubber composition for pneumatic tires for construction vehicles according to claim 1, wherein the sulfur-containing silane coupling agent is selected from bis-(3-triethoxysilylpropyl)tetrasulfide, bis(3-triethoxysilylpropyl) disulfide, 3-trimethoxysilylpropylbenzothiazol tetrasulfide, γ-mercaptopropyltriethoxysilane, or 3-octanoylthiopropyl-triethoxysilane.

13. The rubber composition for pneumatic tires for construction vehicles according to claim 1, wherein the sulfur-containing silane coupling agent is selected from bis-(3-triethoxysilylpropyl)tetrasulfide or bis(3-triethoxysilylpropyl) disulfide.

14. The rubber composition for pneumatic tires for construction vehicles according to claim 1, comprising from 2.5 to 3.0 parts by weight of the sulfur per 100 parts by weight of diene rubber.

15. A pneumatic tire for construction vehicles comprising a tread portion formed by laminating rubber sheets having any width formed from the rubber composition for pneumatic tires for construction vehicles described in claim 1.

* * * * *